Sept. 19, 1961     H. S. RAINEY     3,000,129
FISHING DEVICE

Filed June 30, 1958     3 Sheets-Sheet 1

INVENTOR.
HORACE S. RAINEY
BY John R. Walker, III
Attorney

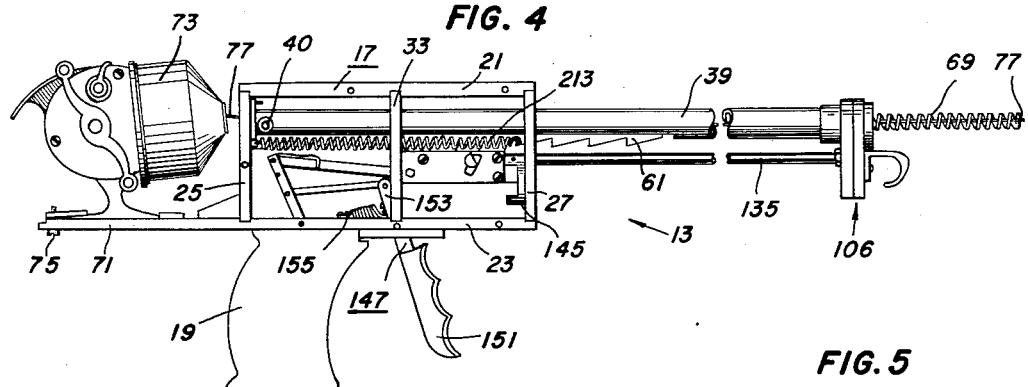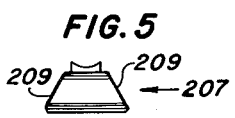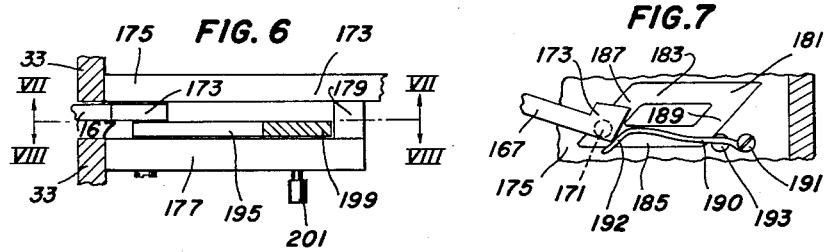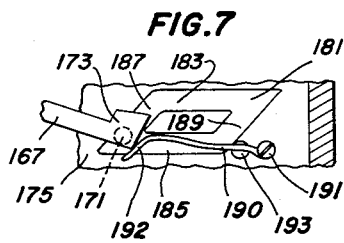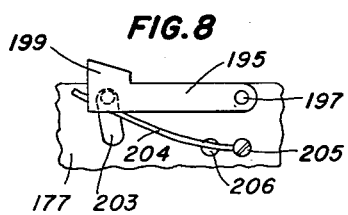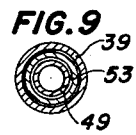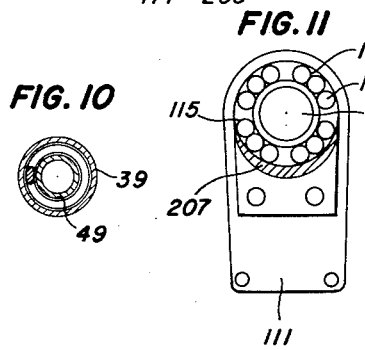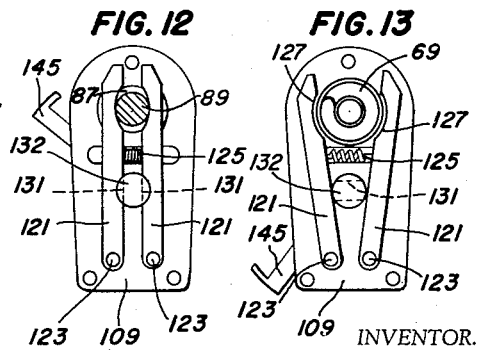
INVENTOR.
HORACE S. RAINEY
BY John R. Walker, III
Attorney Sept. 19, 1961 H. S. RAINEY 3,000,129
FISHING DEVICE
Filed June 30, 1958 3 Sheets-Sheet 3
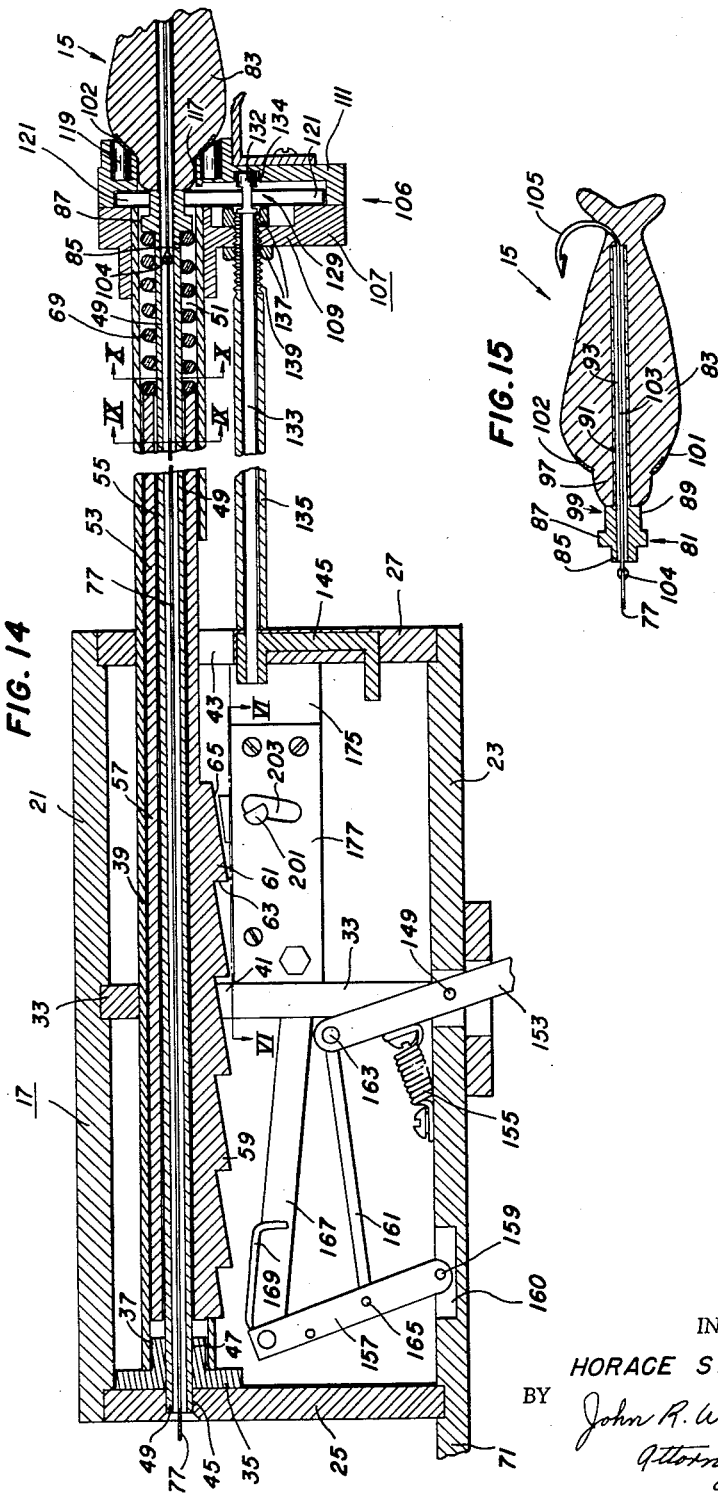
INVENTOR.
HORACE S. RAINEY
BY John R. Walker, III
Attorney United States Patent Office 3,000,129
Patented Sept. 19, 1961

3,000,129
FISHING DEVICE
Horace S. Rainey, 4674 Quince Road, Memphis, Tenn.
Filed June 30, 1958, Ser. No. 745,519
10 Claims. (Cl. 43—19)

This invention relates generally to a fishing device for mechanically casting fishing bait.

The present invention is directed towards providing a fishing device which is much more effective, convenient, and efficient than previous fishing devices of this general character. Heretofore, various devices have been proposed, a great many of which have employed a principle of operation in which the bait was loaded down into the barrel of the gun out of sight and was cast by a spring-loaded mechanism striking the bait. In these devices, the distance that the bait could be cast was very limited since friction of the bait against the barrel caused a slowing down thereof and a great deal of power was dissipated in the striking of the bait by the striking mechanism. Also, the user of the gun could not predict with any degree of accuracy where the bait would fall because each cast was not consistent with the one before it due to differences in the amount of friction with differences in the positioning of the bait, differences in spring pressure used each time, etc.

Thus, one of the important objects of the present invention is to provide a mechanical bait casting device which gives the fisherman complete control over the direction and distance that the bait is cast.

A further object is to provide propelling means in the form of a power spring which has no striking head or the like to contact the bait but, instead, is compressed forwardly against the bait itself with the bait being held in position for subsequent release, whereby when the bait is cast a maximum transfer of energy is effected. Thus, no energy is dissipated in moving a bait-contacting head and the full power of the spring is transferred to the bait.

A further object is to provide such a device in which the major portion of the bait is exterior of the gun with only the nose portion extending into the end of the gun whereby the friction between the gun and the bait is at a minimum.

A further object is to provide in such a device a tube extending centrally of the barrel substantially throughout the length of the gun to receive the fishing line therethrough and prevent tangling of the line.

A further object is to provide in such a device effective magnetic means for automatically positioning the bait accurately when reeled in.

A further object is to provide unique means for automatically disengaging the magnetic means before casting, whereby eliminating any resistance therefrom.

A further object is generally to improve the design and construction of fishing apparatus.

The means by which the foregoing and other objects of the present invention are accomplished and the manner of their accomplishment will be readily understood from the following specification upon reference to the accompanying drawings, in which:

FIG. 4 is a view similar to FIG. 3 but showing the propelling mechanism after the bait has been expelled from the gun.

FIG. 5 is a front elevational view of the bait guide per se.

FIGS. 6 through 15 are on an enlarged scale.

FIG. 6 is a fragmentary sectional view taken as on the line VI—VI of FIG. 14.

FIG. 7 is a fragmentary sectional view taken as on the line VII—VII of FIG. 6.

FIG. 8 is a fragmentary sectional view taken as on the line VIII—VIII of FIG. 6.

FIG. 9 is a transverse sectional view of the gun taken as on the line IX—IX of FIG. 14.

FIG. 10 is a transverse sectional view of the gun taken as on the line X—X of FIG. 14.

FIG. 11 is a front view of the front piece per se, with the bait guide being broken away for purposes of clarity.

FIG. 12 is a sectional view taken as on the line XII—XII of FIG. 1, showing the holding mechanism in a clamping disposition relative to the bait.

FIG. 13 is a view similar to FIG. 12, but showing the fingers in an extended disposition and the bait removed.

FIG. 14 is a fragmentary sectional view of the device taken as on the line XIV—XIV of FIG. 1.

FIG. 15 is a fragmentary sectional view taken as on a vertical plane through the longitudinal center line of the bait.

Figure 1:
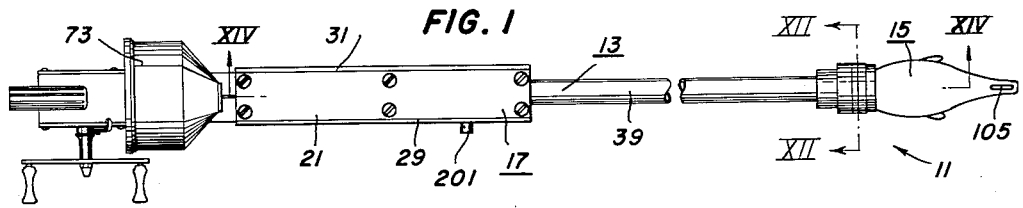
FIG. 1 is a top plan view of the fishing device of the present invention.

Referring now to drawings in which the various parts are indicated by numerals, the fishing device 11 of the present invention comprises, in general, a gun 13 and an artificial bait 15 adapted to be cast thereby.

Gun 13 is preferably of the general shape of a pistol and includes a housing 17 having a gun handle 19 fixedly attached thereto adjacent the bottom of the housing and depending therefrom. Housing 17 preferably comprises a top member 21, a bottom member 23 spaced therebelow, a pair of spaced end members including a rearward end member 25 fixedly mounted adjacent the rearward ends of members 21, 23 and a forward end member 27 fixedly mounted adjacent the forward end of members 21, 23, and a pair of side covers 29, 31 removably attached adjacent opposite side edges of the members 21, 23, 25, and 27 as by screws or the like. A support member 33 extending from top member 21 to bottom member 23 transversely of the housing is preferably provided, which support member is disposed in parallel spaced relationship from rearward and forward end members 25, 27 and supports parts later to be described.

A seat 35 is fixedly mounted on the inner wall of rearward end member 25 and includes a forwardly projecting cylindrical portion 37. A barrel 39 is seated on seat 35 with the cylindrical portion 37 extending into the end thereof and with the barrel being held thereon as by a set screw 40 extending through a threaded opening in the barrel and engaging seat 35. Barrel 39 extends forwardly from seat 35 through an opening 41 in support member 33, through an opening 43 in forward end member 27, and thence forwardly beyond housing 17. An aperture 45 and the bore 47 of seat 35, which bore is aligned with the aperture, receive the end of a tube 49 which is disposed substantially concentric with and in the interior of barrel 39. Tube 49 extends from adjacent the rearward face of rearward end member 25 substantially throughout the length of barrel 39, terminating a short distance from the forward end thereof. Tube 49 and barrel 39 are fixedly mounted relative to housing 17 and relative to each other. The outside diameter of tube 49 is less than the inside diameter of barrel 39, whereby providing an annular space 51 therebetween.

A plunger 53 having a bore 55 is slidably received on tube 49 with the tube extending through the bore, whereby plunger 53 is adapted for forward and rearward longitudinal movement in annular space 51. Plunger 53 includes a cylindrical portion 57 which is the part thereof that moves in annular space 51 and includes a depending portion 59 integrally formed adjacent the rearward end of cylindrical portion 57 and depending therefrom. Depending portion 59 is provided with a plurality of teeth 61. Each of teeth 61 includes a substantially vertical end face 63 and a bottom face 65 upwardly sloping from the end face. An elongated slot 67 is provided in the lower part of barrel 39, through which slot teeth 61 extend to a position below the barrel. The length of slot 67 is such that plunger 53 is not restricted by barrel 39 during the forward and rearward movement of the plunger.

A compression power spring 69 is fixedly mounted adjacent its rearward end to the forward end of plunger 53 as by welding or the like and extends forwardly therefrom an annular space 51 to encircle tube 49.

Bottom member 23 of housing 17 extends rearwardly from rearward end member 25 to provide a platform 71, upon which is fixedly mounted a conventional spinning reel 73 as by screws 75 or the like. Spinning reel 73 includes a conventional fishing line 77 which extends through tube 49 to its point of attachment with bait 15.

Figure 2:
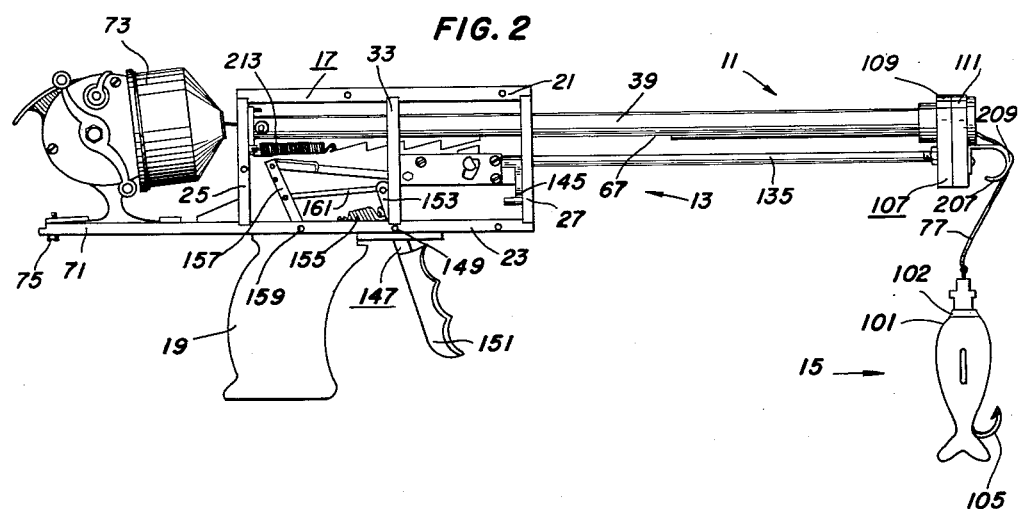
FIG. 2 is a side elevational view of the device with the side cover of the housing removed for purposes of clarity and with the propelling mechanism being shown in the rearward or "at-rest" position.

In general, bait 15 includes a nose portion 81 and a body portion 83 fixedly attached thereto and extending rearwardly therefrom. Nose portion 81 includes a reduced cylindrical end portion 85, a flange 87 rearwardly of end portion 85, and an intermediate cylindrical portion 89 rearwardly of flange 87 and forwardly of body portion 83. The diameter of intermediate cylindrical portion 89 is preferably greater than the diameter of reduced end portion 85 but less than the diameter of flange 87. An elongated spindle 91 is fixedly attached to nose portion 81 and extends rearwardly therefrom. End portion 85, flange 87, intermediate portion 89, and elongated spindle 91 are preferably integrally formed to provide a base for the bait and a bore 93 is centrally provided therein which extends the length thereof from the forward end of end portion 85 to the rearward end of spindle 91. Body portion 83 is preferably shaped like a fish and formed of plastic or the like, being preferably molded over elongated spindle 91. It will be understood that body portion 83 may be molded in various shapes without departing from the spirit and scope of the present invention. The forward part or head 97 of body portion 83 is preferably generally cylindrical in shape and greater in diameter than intermediate portion 89, whereby forming an annular groove 99 between flange 87 and the forward end of head 97. Body portion 83 flares outwardly from head 97 to form shoulder 101, upon which is fixedly mounted a ring 102 of a metal, as tin or the like, which is adapted to be attracted by a magnet. A rod 103 extends through bore 93, which rod is provided with an eyelet 104 in the end thereof outwardly extending beyond nose portion 81 to which fishing line 77 is attached. Additionally, rod 103 is provided with a fish hook 105 integrally formed adjacent the opposite end of the rod from eyelet 104. Fish hook 105 extends beyond body portion 83, as best shown in FIGS. 2 and 15, in position for catching a fish.

Bait holding means 106 is provided adjacent the outer end of barrel 39 for holding the bait in position in the end of the gun prior to the casting thereof. In said held position, best shown in FIGS. 1 and 14, it will be seen that the major part of bait 15 is disposed on the exterior of gun 13 with only nose portion 81 and head 97 extending into the end of the gun.

Holding means 106 comprises a casing 107, which casing includes a rearward piece 109 and a forward piece 111 removably mounted on rearward piece 109 as by screws or the like. Rearward piece 109 is fixedly mounted on barrel 39 adjacent the forward end of the barrel with the barrel extending through a bore in the rearward piece 109. A plurality of sockets 115 are disposed in a circular pattern around the bore 117 of forward piece 111. Magnets 119 are respectively disposed in sockets 115 and are arcuately shaped to fit the metal ring 102 of bait 15 so that the bait is adapted to be held by magnetic attraction in contact with the magnet. A pair of fingers 121 are pivotally mounted adjacent the lower end thereof as at pivot points 123 from the forward face of rearward piece 109 in the interior of casing 107. A tension spring 125 is attached adjacent opposite ends thereof to fingers 121 to urge the fingers into a substantially vertical or clamping disposition on intermediate portion 89 in groove 99 of bait 15, as best shown in FIGS. 12 and 14. Each of fingers 121 is cut out on the edge thereof adjacent the other finger to provide an arcuately-shaped edge, as at 127.

Trigger means, which includes a cam 129, is provided for pivoting the fingers outwardly about pivot points 123 to a spread or extended disposition, shown in FIG. 13 wherein it will be seen the fingers are spread outwardly beyond power spring 69, whereby the end of the bait, as well as the power spring, is adapted to pass between the fingers. Cam 129 is preferably formed by establishing flattened portions 131 on opposite sides of an enlarged circular end 132 of shaft 133 by milling out the flattened portions in the opposite sides of the enlarged end. A recess 134 in forward piece 111 accommodates the forward end of enlarged end 132. Shaft 133 is rotatably mounted in a sleeve 135 extending between rearward piece 109 and forward end member 27 with the sleeve being fixedly mounted as by nuts 137 engaging a threaded portion 139 of the sleeve on opposite sides of rearward piece 109 to anchor the sleeve to the rearward piece. Enlarged end 132 is disposed forwardly of sleeve 135 with the part of shaft 133 having the smaller diameter extending from enlarged end 132 rearwardly through sleeve 135 and therebeyond. At the rearward end of shaft 133, which is beyond sleeve 135, a lever 145 is fixedly mounted thereon for rotating the shaft. When lever 145 is in an upward position, as shown in FIG. 12, flattened portions 131 are disposed adjacent fingers 121 to permit the fingers to assume the clamping position shown in FIG. 12. When lever 145 is pushed downwardly to a downward position, as shown in FIG. 13, the rounded portion of circular end 132 is disposed adjacent the fingers to cause the fingers to assume the extended spread disposition shown in FIG. 13.

Cocking means is provided for moving plunger 53 forwardly to compress power spring 69 between the forward end of the plunger and bait 15. Said cocking means includes a plunger-moving means and a plunger-holding means hereinafter described. Said plunger-moving means is shown in the drawings as being disposed in the left-hand portion of the gun 13, and said holding means is disposed in the right-hand portion of the gun. By right- and left-hand portions is means the portions respectively to the right and left as it appears to a person holding the gun by the handle out in front of him with the gun pointed so as to shoot straight ahead. This disposition of the plunger-moving and plunger-holding means is best shown in FIG. 6.

Figure 3:
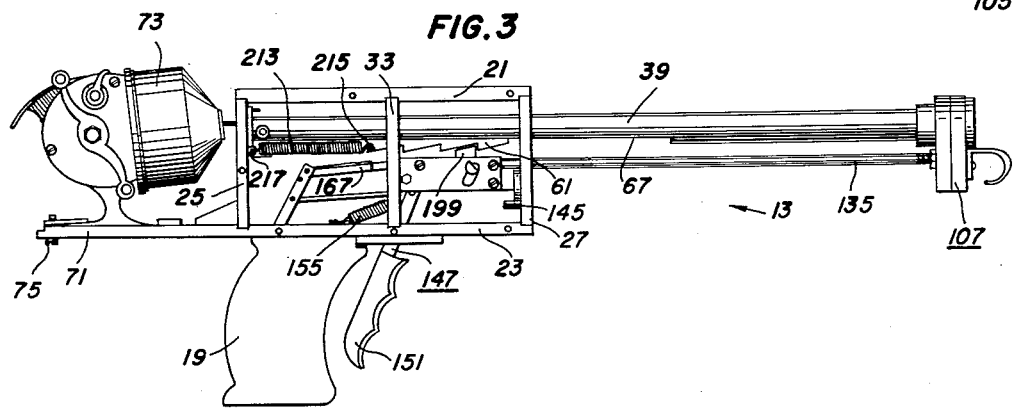
FIG. 3 is a view similar to FIG. 2 but with the propelling mechanism being shown in an intermediate position and the bait removed.

Said moving means comprises a hand-grip arm 147 pivotally mounted intermediate its ends as at 149 for swinging movement from and to an "at-rest" or forward position in which the lower part thereof is forward, as best shown in FIG. 2, and to and from a retracted or rearward position in which the lower part thereof is rearward, as best shown in FIG. 3. Hand-grip arm 147 preferably comprises a hand-grip portion 151 formed of plastic or the like molded onto one end of an elongated arm portion 153. A tension spring 155 is fastened at one end to the upper end of hand-grip arm 147 and at the other end to housing 17. Spring 155 urges hand-grip arm 147 into said "at-rest" position. A rockable arm 157 is pivotally connected adjacent its lower end as at 159 to bottom member 23 in a cut-out portion 160 in the bottom member. A link 161 is hingedly connected adjacent one end to the upper end of hand-grip arm 147 as at 163 and is hingedly connected adjacent its opposite end to arm 157 intermediate the ends of arm 157 as at 165. The upper end of rockable arm 157 is hingedly connected to the rearward end of a plunger-engaging arm 163. A spring 169 is fixedly mounted from rockable arm 157 adjacent the upper end thereof and engages plunger-engaging arm 167 to urge the plunger-engaging arm downwardly. Extending laterally to the left, as hereinabove defined, from the opposite end of plunger-engaging arm 167 is a follower or roller 171, rotatably mounted from the arm. The end of plunger-engaging arm 167 adjacent roller 171 is provided with an upwardly extending projection 173 adapted to engage teeth 61.

A plate 175 extends between forward end member 27 and support member 33 intermediate the ends of the members 27, 33. Another plate 177, shorter in length than plate 175, extends parallel with plate 175 and spaced therefrom and is supported adjacent its rearward end from support member 33 and is supported from plate 175 adjacent its forward end by an end plate 179 disposed between plates 175 and 177.

The inner face or right side of plate 175 is milled out to provide a guideway 181 shaped substantially in the form of a parallelogram, which guideway is adapted to receive roller 171 which, in turn, guides the path of movement of plunger-engaging arm 167 and projection 173 during the operation of the device, as will be later described. Guideway 181 includes an upper portion 183, a lower portion 185 spaced therebelow in substantially parallel relationship, a rearward portion 187 angled forwardly from lower portion 185 and connecting the rearward ends of portions 183, 185 and a forward portion 189 substantially parallel with rearward portion 187 and connecting the forward ends of portions 183, 185. A spring 190 is fixedly attached to plate 175 adjacent the juncture of lower portion 185 and forward portion 189 as by a screw 191 and extends rearwardly and upwardly therefrom substantially diagonally across lower portion 185 with the end of the spring being turned downwardly as at 192. An additional screw 193 is preferably provided adjacent screw 191, with spring 190 extending through the slot in screw 193 to add additional support thereto and prevent the spring from turning.

Said plunger-holding means includes a pawl 195 pivotally connected as at 197 to plate 177. Pawl 195 includes a projection 199 engageable with teeth 61. Additionally, pawl 195 includes a knob 201 extending laterally therefrom through a slot 203 provided in plate 177. Knob 201 extends outwardly beyond plate 177 in position for being pushed downwardly against a spring 204 which is fixedly mounted, as by a screw 205, from plate 177 and engages pawl 195 to urge the pawl upwardly into engagement with teeth 61. An additional screw 206 is preferably provided adjacent screw 205, with spring 204 extending through the slot in screw 206 to add additional support thereto and prevent the spring from turning.

A guide memebr 207 is fixedly attached to casing 107 and extends forwardly therefrom for guiding bait 15 into the end of the barrel when the line is reeled in. Guide member 207 is preferably flared downwardly to provide a convex surface for the bait to ride against and is preferably turned upwardly at the sides as at 209 to guide the bait.

In the operation of the fishing device 11 of the present invention, with lever 145 in a downward position heretofore described, bait 15 may be loaded in the end of gun 13 by winding in fishing line 77 with spinning reel 73 until the bait is in the position best shown in FIG. 14. This is the initial position of bait 15 and, as heretofore explained, the bait will be drawn into and held in this position by the magnetic attraction of magnets 119. In this initial position, it will be seen eyelet 104 is received in the end of tube 49; end portion 85 is received in the end of spring 69 with the spring bearing against flange 87; head 97 is received in bore 117; and ring 102 is in abutment with magnets 119. After bait 15 has been reeled in and is in said initial position above described, lever 145 is pushed upwardly to move fingers 121 into the previously described clamping position. Next, gun 13 is cocked by moving plunger 53 forwardly against power spring 69 to compress the spring against bait 15. To move plunger 53, gun 13 is held by handle 19 with the fingers extending around hand-grip portion 151 and with a squeezing motion the hand-grip arm 147 is caused to swing from said "at-rest" position to said retracted position, which moves the plunger by one notch or step. The following explains how this is accomplished: Referring, first, to FIG. 7, which shows the plunger-engaging arm 167 in a rearward position that corresponds to the "at-rest" position of hand-grip arm 147, it will be seen that roller 171 rests in lower portion 185 rearwardly of spring 190. As the lower part of hand-grip arm 147 is swung rearwardly, plunger-engaging arm 167 is pushed forwardly by the linkage comprising link 161 and rockable arm 157, which causes roller 171 to ride up in rearward portion 187 and to lift the plunger-engaging arm into engagement with teeth 61. Continued swing of hand-grip arm 147 causes roller 171 to ride forwardly in upper portion 183 and, at the same time, causes plunger 53 to be moved forwardly one step, at which time pawl 195 engages one of teeth 61 to hold plunger 53 in this position. It will be understood that at the end of the above-described movement roller 171 will be in alignment with forward portion 189, at which time plunger-engaging arm 167 will be pushed downwardly by spring 169. Subsequent release of hand grip 151 will cause plunger-engaging arm 167 to move rearwardly to the position shown in FIG. 7, carrying with it, and being guided by, roller 171 moving rearwardly in lower portion 185 past spring 190. Spring 190 acts as a guide for roller 171, the spring being moved out of the way by the roller in its rearward travel, but guiding the roller up rearward portion 187 and preventing the roller from moving forwardly down lower portion 185 when hand-grip arm 147 is swung rearwardly again.

After plunger 53 has been moved forwardly one step, as above described, and hand-grip 151 subsequently released, hand-grip 151 may be "squeezed" again to repeat the above-described operation which will move plunger 53 forwardly another step to compress power spring 69 still more. Thus, hand-grip 151 may be "squeezed" as many times as required to give the correct number of steps of movement of plunger 53 for the desired propelling power.

When power spring 69 is compressed against bait 15 as above described, the power spring will overcome the magnetic force holding bait 15 against magnets 119 and will urge the bait outwardly in a limited movement away from magnets 119. Bait 15 will be stopped against further movement since flange 87 will be prevented from further movement when it abuts fingers 121. It will be understood that groove 99 is of greater width than fingers 121 to permit movement of bait 15 in this manner. This limited movement of bait 15 away from magnets 119 is an important feature of the present invention since once the magnets 119 have done their initial work of aiding in centering and aligning the bait, they are disengaged therefrom so as to prevent any resistance on the bait when it is subsequently propelled.

After the correct amount of energy is stored in power spring 69 to give the desired distance of travel of bait 15, the bait is cast by pushing downwardly on lever 145 for spreading fingers 121 out of groove 99 to release the bait. When the bait is released as above described, it will be propelled forwardly by power spring 69 which remains in contact with the bait until the entire energy of the spring has been transferred to the bait. This is so since power spring 69 will also move out of the end of the gun, as best shown in FIG. 4. In addition, this extension of power spring 69 on the exterior of the gun provides resilient means for allowing play of the bait when a fish is caught. In other words, it has the same effect as a resilient fishing pole. Before the bait is again reeled in, spring 69 should be retracted into barrel 39 by pushing downward on knob 201 to release plunger 53, which is urged rearwardly to its "at-rest" position by a return spring 213, attached at one end to plunger 53 at 215 and attached at the other end to rearward end member 25 at 217.

From the foregoing description, it is apparent that an efficient and effective fishing device is provided, whereby accuracy in both direction and distance in the casting of bait may be obtained. It is further apparent that there is a minimum amount of resistance to the propelling of the bait since only a small portion thereof is held in the gun and since the power spring 69 remains in engagement with the bait and provides a "follow-through" action to gain more distance.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A fishing device comprising a bait and a gun including a housing having a rearward and a forward end, a barrel mounted on said housing and extending forwardly therebeyond, a tube centrally disposed in said barrel, said tube extending from adjacent the rearward end of said housing substantially throughout the length of said barrel, a reel mounted adjacent the rearward end of said housing and including a fishing line wound thereon, said fishing line extending through said tube and attached to said bait, said bait including a nose portion and a body portion, said nose portion and said body portion providing a groove therebetween, magnetic means mounted on said gun adjacent the end of said barrel for magnetically attracting the bait to a position of engagement therewith when the bait is drawn in proximity thereto by reeling in said fishing line, when in said position of engagement said nose portion being disposed in the end of said barrel and said body portion being disposed on the exterior of the barrel, holding means mounted on said gun and including at least one finger adapted for movement between a position in which the finger is disposed in said groove for holding the bait against ejection from the gun and a position in which the finger is retracted from said groove, said groove being of a greater width than said finger whereby said bait is adapted for limited longitudinal movement relative to the finger, a plunger slidably received between said barrel and said tube for forward and rearward movement, a power spring attached to said plunger adjacent the forward end of the plunger, said spring extending forwardly between said barrel and said tube and engaging said bait, cocking means engageable with said plunger, said cocking means including a hand-grip arm pivotally mounted in said gun for the manual operation of said cocking means, a plunger-engaging arm, linkage means connecting said hand-grip arm to said plunger-engaging arm and arranged to cause forward and rearward movement of said plunger-engaging arm by said hand-grip arm, a roller mounted on said plunger-engaging arm, said gun being provided with a guideway therein adapted to receive said roller and to guide said plunger-engaging arm, said plunger being provided with a plurality of teeth, said plunger-engaging arm being guidable by said roller in said guideway into engagement with successive teeth of said plunger upon successive forward movements of said plunger-engaging arm by said hand-grip arm whereby said plunger is movable forwardly against said power spring to compress the power spring between the plunger and the bait, pawl means engageable with said plunger for retaining the plunger at successive steps, compression of said power spring being effective to urge said bait a limited amount out of engagement with said magnetic means, trigger means operably coupled to said finger for retracting the finger from said groove to allow the bait to be cast from said gun by said power spring, said power spring extending from said gun after casting of said bait whereby acting as resilient means for allowing play of the fishing line.

2. A fishing device comprising a bait and a gun including a housing having a rearward and a forward end, a barrel mounted on said housing and extending forwardly therebeyond, a tube centrally disposed in said barrel, said tube extending from adjacent the rearward end of said housing substantially throughout the length of said barrel, a reel mounted adjacent the rearward end of said housing and including a fishing line wound thereon, said fishing line extending through said tube and attached to said bait, said bait being adapted to be reeled in by said reel into a position of engagement with said gun, said bait including a nose portion and a body portion, said nose portion and said body portion providing a groove therebetween, when in said position of engagement said nose portion being disposed in the end of said barrel and said body portion being disposed on the exterior of the barrel, holding means mounted on said gun and including at least one finger adapted for movement between a position in which the finger is disposed in said groove for holding the bait against ejection from the gun and a position in which the finger is retracted from said groove, a plunger slidably received between said barrel and said tube for forward and rearward movement, a power spring attached to said plunger adjacent the forward end of the plunger, said spring extending forwardly between said barrel and said tube and engaging said bait, cocking means engageable with said plunger, said cocking means including a hand-grip arm pivotally mounted in said gun for the manual operation of said cocking means, a plunger-engaging arm, linkage means connecting said hand-grip arm to said plunger-engaging arm and arranged to cause forward and rearward movement of said plunger-engaging arm by said hand-grip arm, a roller mounted from said plunger engaging arm, said gun being provided with a guideway therein adapted to receive said roller and to guide said plunger-engaging arm, said plunger being provided with a plurality of teeth, said plunger-engaging arm being guidable by said roller in said guideway into engagement with successive teeth of said plunger upon successive forward movements of said plunger-engaging arm by said hand-grip arm whereby said plunger is movable forwardly against said power spring to compress the power spring between the plunger and the bait, pawl means engageable with said plunger for retaining the plunger at successive steps, trigger means operably coupled to said finger for retracting the finger from said groove to allow the bait to be cast from said gun by said power spring, said power spring extending from said gun after casting of said bait whereby acting as resilient means for allowing play of the fishing line.

3. A fishing device comprising a gun including a barrel, a bait removably received in said barrel, a fishing line mounted on said gun and attached to said bait, magnetic means mounted on said gun adjacent said bait for magnetically attracting the bait to a position in engagement therewith, said bait being provided with a groove therein, holding means mounted on said gun and including at least one finger adapted for movement between a position in which the finger is disposed in said groove for holding the bait against ejection from the gun and a position in which the finger is retracted from said groove, said groove being of a greater width than said finger whereby said bait is adapted for limited longitudinal movement relative to the finger, a plunger movably received in said barrel.

a power spring received in said barrel between said plunger and said bait, cocking means engageable with said plunger, said cocking means being arranged to move said plunger in successive steps against said spring to compress the spring between the plunger and the bait whereby causing said bait to move a limited amount out of engagement with said magnetic means, trigger means operably coupled to said finger for retracting the finger from said groove to allow the bait to be cast from said gun, said power spring extending from said gun after casting of said bait whereby acting as resilient means for allowing play of the fishing line.

4. A fishing device comprising a gun including a barrel, a bait removably received in said barrel, said bait including a body portion, substantially all of said body portion extending outside of said barrel, a fishing line mounted from said gun and attached to said bait, said bait being provided with a groove therein, holding means mounted on said gun and including at least one finger adapted for movement between a position in which the finger is disposed in said groove for holding the bait against ejection from the gun and a position in which the finger is retracted from said groove, a plunger movably received in said barrel, a power spring received in said barrel between said plunger and said bait, said spring including a forward end, said spring being in direct contact with said bait over a substantial area of said forward end, cocking means engageable with said plunger, said cocking means being arranged to move said plunger in a selected number of successive steps against said spring to compress the spring between the plunger and the bait, by a selected predetermined amount so that the distance that the bait will travel can be selectively determined before casting trigger means operably coupled to said finger for retracting the finger from said groove to allow the bait to be cast from said gun, said spring being arranged so that said forward end thereof is outside of said barrel when said bait departs therefrom, whereby the last contact between said gun and said bait is by said spring outside of said barrel.

5. A fishing device comprising a gun including a barrel, a bait removably received in said barrel, said bait including a body portion, substantially all of said body portion extending outside of said barrel, holding means mounted on said barrel for holding said bait in said barrel, a plunger movably received in said barrel, a power spring having a forward and a rearward end, said spring being fixedly mounted on said plunger adjacent said rearward end, said spring being in direct contact with said bait over a substantial area of said forward end, cocking means engageable with said plunger, said cocking means being arranged to move said plunger in a selected number of successive steps against said spring to compress the spring between the plunger and the bait by a predetermined amount so that the distance that the bait will travel can be selectively determined before casting, trigger means for releasing said holding means from said bait whereby the energy of said spring is transferred to said bait for the casting thereof, said spring being arranged so that said forward end thereof is outside of said barrel when said bait departs therefrom, whereby the last contact between said gun and said bait is by said spring outside said barrel.

6. A fishing device comprising a bait and a gun including a barrel, said bait including a nose portion forming a minor portion thereof and a body portion extending outwardly from said nose portion, holding means mounted on said barrel, said bait being removably held in the end of said barrel by said holding means with only said nose portion extending into the barrel and with substantially all of said body portion extending on the exterior of the barrel, a plunger movably received in said barrel, a power spring having a forward end and a rearward end, said spring being fixedly mounted from said plunger adjacent said rearward end, said spring being in direct contact with said bait over a substantial area of said forward end, cocking means engageable with said plunger, said cocking means being arranged to move said plunger against said spring to compress the spring between the plunger and the bait, trigger means for releasing said holding means from said bait whereby the energy of said spring is transferred to said bait for the casting thereof, said spring being arranged so that said forward end thereof is outside of said barrel when said bait departs therefrom, whereby the last contact between said gun and said bait is by said spring outside of said barrel.

7. An artificial bait comprising a nose portion, a spindle attached to said nose portion and extending rearwardly therefrom, a body portion formed over said spindle and extending rearwardly from said nose portion, said nose portion and said spindle being provided with a bore therethrough, a rod extending through said bore, said rod having an eyelet adjacent the forward end thereof adapted to have a fishing line attached thereto, a fish hook attached to said rod adjacent the rearward end of the rod with the fish hook extending from the exterior of said body portion in position for catching a fish; said nose portion including a reduced cylindrical end portion, a flange rearwardly of said end portion and an intermediate cylindrical portion rearwardly of said flange; said body portion including a substantially cylindrical head disposed adjacent said nose portion, said body portion being flared outwardly from said head to establish a shoulder, a metallic ring attached to said body portion adjacent said shoulder, said head being of greater diameter than said intermediate portion whereby providing an annular groove in the bait between said flange and said head.

8. A propelling device comprising missile means and a gun including a barrel, said missile means including a nose portion forming a minor portion thereof and a body portion extending outwardly from said nose portion, holding means mounted on said barrel, said missile means being removably held in the end of said barrel by said holding means with only said nose portion extending into the barrel and with substantially all of said body portion extending from the exterior of the barrel, a plunger received in said barrel, a power spring having a forward end and a rearward end, said spring being fixedly mounted on said plunger adjacent said rearward end, said spring being in direct contact with said missile means over a substantial area of said forward end, cocking means engageable with said plunger, said cocking means being arranged to move said plunger against said spring to compress the spring between the plunger and the missile means, trigger means for releasing said holding means from said missile means whereby the energy of said spring is transferred to said missile means for the casting thereof, said spring being arranged so that said forward end thereof is outside of said barrel when said missile means departs therefrom, whereby the last contact between said gun and said missile means is by said spring outside of said barrel.

9. A propelling device comprising missile means and a gun including a barrel, said missile means including a nose portion and a body portion extending outwardly from said nose portion, said nose portion including a flange, holding means mounted on said barrel, said missile means being removably held in the end of said barrel by said holding means with only said nose portion extending into said barrel and with substantially all of said body portion extending from the exterior of said barrel, propelling means including a power spring, said power spring being arranged so that one end thereof is in contact with said flange over a substantial area, means for compressing said power spring and means for releasing said power spring for the casting of said missile means, said power spring being arranged so that the end thereof is outside of said barrel when said missile means departs therefrom during casting whereby there is no friction between said barrel and said missile means after all of the energy is imparted to said missile means.

10. A propelling device comprising missile means and a gun including a barrel, said missile means including a nose portion and a body portion extending outwardly from said nose portion, said nose portion including a flange, holding means mounted on said barrel, said missile means being removably held in the end of said barrel by said holding means with only said nose portion extending into said barrel and with substantially all of said body portion extending from the exterior of said barrel, a plunger received in said barrel, a power spring fixedly mounted on said plunger, said power spring being arranged so that one end thereof is in contact with said flange over a substantial area and so that said end portion is received in said one end, cocking means engageable with said plunger, said cocking means being arranged to move said plunger against said spring to compress said spring between said plunger and said missile means, trigger means for releasing said holding means from said missile means for the casting thereof, said power spring being arranged so that the end thereof is outside of said barrel when said missile means departs therefrom during casting whereby there is no friction between said barrel and said missile means after all of the energy is imparted to said missile means.

References Cited in the file of this patent

UNITED STATES PATENTS

| | | |
|---|---|---|
| 1,269,854 | Pottier | June 18, 1918 |
| 1,335,448 | Menon | Mar. 30, 1920 |
| 1,723,557 | Ono | Aug. 6, 1929 |
| 2,089,744 | Golden | Aug. 10, 1937 |
| 2,256,813 | Minika | Sept. 23, 1941 |
| 2,267,065 | Wilen | Dec. 31, 1941 |
| 2,542,777 | Loew | Feb. 20, 1951 |
| 2,573,399 | Cannon | Oct. 30, 1951 |
| 2,817,329 | Wehrfritz | Dec. 24, 1957 |
| 2,896,604 | Rebikoff | July 28, 1959 |